US012093507B2

(12) United States Patent
Torikai et al.

(10) Patent No.: US 12,093,507 B2
(45) Date of Patent: Sep. 17, 2024

(54) PRESENTATION SYSTEM, INFORMATION TERMINAL, AND PRESENTATION METHOD

(71) Applicant: Panasonic Intellectual Property Management Co., Ltd., Osaka (JP)

(72) Inventors: Masafumi Torikai, Osaka (JP); Hiroki Urabe, Osaka (JP); Hiromu Ikeuchi, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 65 days.

(21) Appl. No.: 17/800,160

(22) PCT Filed: Dec. 24, 2021

(86) PCT No.: PCT/JP2021/048437
§ 371 (c)(1),
(2) Date: Aug. 16, 2022

(87) PCT Pub. No.: WO2023/013095
PCT Pub. Date: Feb. 9, 2023

(65) Prior Publication Data
US 2023/0251757 A1 Aug. 10, 2023

(30) Foreign Application Priority Data
Aug. 5, 2021 (JP) ................................ 2021-129341

(51) Int. Cl.
*G06F 3/0482* (2013.01)
*G06F 3/14* (2006.01)
(Continued)

(52) U.S. Cl.
CPC .......... *G06F 3/0482* (2013.01); *G06F 3/1423* (2013.01); *G06F 3/165* (2013.01); *H04L 12/2827* (2013.01)

(58) Field of Classification Search
CPC ...... G06F 3/0482; G06F 3/1423; G06F 3/165; H04L 12/2827
See application file for complete search history.

(56) References Cited

U.S. PATENT DOCUMENTS

| 2015/0094825 A1* | 4/2015 | Kinoshita | .......... H04L 12/2825 700/19 |
| 2019/0342251 A1* | 11/2019 | Dascola | .............. G06F 3/04883 |

FOREIGN PATENT DOCUMENTS

JP 2008-046424 A 2/2008

OTHER PUBLICATIONS

International Search Report issued on Mar. 15, 2022 in International Patent Application No. PCT/JP2021/048437.

* cited by examiner

*Primary Examiner* — Stephen S Hong
*Assistant Examiner* — Darrin Hope
(74) *Attorney, Agent, or Firm* — Rimon P.C.

(57) ABSTRACT

A presentation system includes a server, a presentation device, and an information terminal. The server includes: a first communicator that communicates with the presentation device; a first controller that sends, to the presentation device, a notification that has been associated in advance with a condition satisfied by an operation state obtained from the appliance; and a storage that stores a history of the sent notification. The presentation device presents the notification. The information terminal includes: a display; an acceptor that accepts an operation; a second communicator that communicates with the server; and a second controller that creates a user interface (UI) for accepting the operation, and causes the display to display the UI. The second controller obtains the history from the server via the second (Continued)

communicator. The UI includes the obtained history and accepts turning off the notification included in the history.

12 Claims, 12 Drawing Sheets

(51) Int. Cl.
*G06F 3/16* (2006.01)
*H04L 12/28* (2006.01)

FIG. 3

| Condition | Notification content |
|---|---|
| Condition 1 | Scenario 1 |
| Condition 2 | Scenario 2 |
| Condition 3 | Scenario 3 |
| ... | ... |

FIG. 4

| Date and time | Notification content | Result |
|---|---|---|
| 2020/6/5 19:00 | Scenario 1 | Yes |
| 2020/6/5 20:10 | Scenario 2 | Yes |
| 2020/6/5 20:30 | Scenario 3 | No |
| ... | ... | ... |

FIG. 6

```
                                                    ─300
┌─────────────────────────────────────────┐
│ Notification history                    │
├─────────────────────────────────────────┤
│ Notification content  XXXXXXXXXXXXXXXXX │─301
│ 2020/6/5  19:00                         │
├─────────────────────────────────────────┤
│ Notification content  XXXXXXXXXXXXXXXXX │
│ 2020/6/5  20:10                         │
├─────────────────────────────────────────┤
│ Notification content  XXXXXXXXXXXXXXXXX │
│ 2020/6/5  20:30                         │
├─────────────────────────────────────────┤
│ Notification content  XXXXXXXXXXXXXXXXX │
│ 2020/6/5  20:40                         │
├─────────────────────────────────────────┤
│ Notification content  XXXXXXXXXXXXXXXXX │
│ 2020/6/5  20:45                         │
├─────────────────────────────────────────┤
│ Notification content  XXXXXXXXXXXXXXXXX │
│ 2020/6/5  20:51                         │
├─────────────────────────────────────────┤
│ Notification content  XXXXXXXXXXXXXXXXX │
│ 2020/6/5  21:00                         │
├─────────────────────────────────────────┤
│ Notification content  XXXXXXXXXXXXXXXXX │
│ 2020/6/5  21:17                         │
│                                         │
└─────────────────────────────────────────┘
```

PRESENTATION SYSTEM, INFORMATION TERMINAL, AND PRESENTATION METHOD

CROSS-REFERENCE OF RELATED APPLICATIONS

This application is the U.S. National Phase under 35 U.S.C. § 371 of International Patent Application No. PCT/JP2021/048437, filed on Dec. 24, 2021, which in turn claims the benefit of Japanese Patent Application No. 2021-129341, filed on Aug. 5, 2021, the entire disclosures of which Applications are incorporated by reference herein.

TECHNICAL FIELD

The present disclosure relates to a presentation system, an information terminal, and a presentation method.

BACKGROUND ART

Patent Literature (PTL) 1 discloses a household electric appliance having an utterance function in which sound source data is reproduced to thereby output voice. The household electric appliance of this type reproduces voice that indicates a detail of its state, at a timing when the state of the household electric appliance is changed. Accordingly, a user recognizes that the state of the household electric appliance is changed.

CITATION LIST

Patent Literature

PTL 1
   Japanese Unexamined Patent Application Publication No. 2008-46424

SUMMARY OF INVENTION

Technical Problem

However, it is difficult for a user to easily set to turn off a notification that is notified by, for example, reproducing voice, in a conventional technique represented by PTL 1.

The present disclosure provides, for example, a presentation system that allows a user to easily set to turn off a notification.

Solution to Problem

A presentation system according to the present disclosure includes: a server, a presentation device, and an information terminal, the presentation device and the information terminal being connected to the server via a network, in which the server includes: a first communicator that communicates with the presentation device via the network; a first controller that sends, to the presentation device via the first communicator, a notification that has been associated in advance with a condition satisfied by an operation state of each of one or more appliances, the operation state being obtained from a corresponding one of the one or more appliances via the network; and a storage that stores a history of the notification having been sent to the presentation device, the presentation device receives the notification from the server via the network, and presents the notification, the information terminal includes: a display; an acceptor that accepts an operation performed by a user; a second communicator that communicates with the server via the network; and a second controller that creates a user interface (UI) for accepting the operation, and causes the display to display the UI, the second controller obtains the history from the server via the second communicator, and the UI includes the history obtained and accepts turning off the notification included in the history.

An information terminal according to the present disclosure is an information terminal in a presentation system that includes a server, a presentation device, and the information terminal, the presentation device and the information terminal being connected to the server via a network, the information terminal including: display; an acceptor that accepts an operation performed by a user; a second communicator that communicates with the server via the network; and a second controller that creates a user interface (UI) for accepting the operation, and causes the display to display the UI, in which the second controller obtains, from the server via the second communicator, a history of a notification that has been sent to the presentation device according to an operation state of each of one or more appliances, the operation state having been obtained from the one or more appliances by the server via the network; and the UI includes the history obtained and accepts turning off the notification included in the history.

A presentation method according to the present disclosure is a presentation method performed by a presentation system that includes a server, a presentation device, and an information terminal, the presentation device and the information terminal being connected to the server via a network, the presentation method including: in the server, communicating with the presentation device via the network; sending, to the presentation device, a notification that has been associated in advance with a condition satisfied by an operation state of each of one or more appliances, the operation state being obtained from a corresponding one of the one or more appliances via the network; and storing a history of the notification having been sent to the presentation device, in the presentation device, receiving the notification from the server via the network, and presenting the notification, and in the information terminal, communicating with the server via the network by a second communicator included in the information terminal; creating a user interface (UI) for accepting an operation performed by a user, and causing a display to display the UI, the display being included in the information terminal; and obtaining the history from the server, in which the UI includes the history obtained, and accepts turning off the notification included in the history.

It should be noted that these comprehensive or specific aspects may be embodied by a device, a method, an integrated circuit, a computer program, or a non-temporal computer-readable recording medium such as a CD-ROM, or may be embodied by any combination of the device, the method, the integrated circuit, the computer program, and the recording medium.

Advantageous Effects of Invention

According to a presentation system of the present disclosure, a user can easily set to turn off a notification.

BRIEF DESCRIPTION OF DRAWINGS

FIG. 3 is a diagram showing an example of association information.

FIG. 4 is a diagram showing an example of a history.

FIG. 6 is a diagram showing a specific example of the UI.

DESCRIPTION OF EMBODIMENTS

Knowledge Underlying the Present Disclosure

The present inventors have found problems as described below, in techniques described in "Background Art" of the description.

It has been required for the conventional technique to easily set notification to a user to be turned off. In order to set the notification to be turned off, a user is required to specify a notification that the user wants to turn off among various notifications. Accordingly, it is necessary for a user to perform operation for specifying the notification that the user wants to turn off, onto a terminal that accepts the setting. The terminal that has accepted the operation is required to perform processing in response to the operation. As mentioned above, a user is required to specify, with labor, the notification that the user wants to turn off, and a processing load for executing the processing is applied to the terminal.

In view of the above, the present inventors have found, for example, a presentation system that allows a user to easily set a notification to be turned off, as a result of earnest investigation.

Hereinafter, embodiments are described in detail, with appropriate reference to the drawings. Here, unnecessarily detailed description may be omitted. For example, detailed description for well-known matters and duplicate description for substantially the same configuration may be omitted. This prevents the below description from becoming unnecessarily redundant, to facilitate the understanding by a person skilled in the art.

It should be noted that the inventors of the present disclosure provide the accompanying drawings and the description below for a person skilled in the art to sufficiently understand the present disclosure, and thus do not intend to limit the subject matters recited in the scope of claims, by the drawings and the description.

EMBODIMENT

1. Outline of Presentation System

Figure 1:
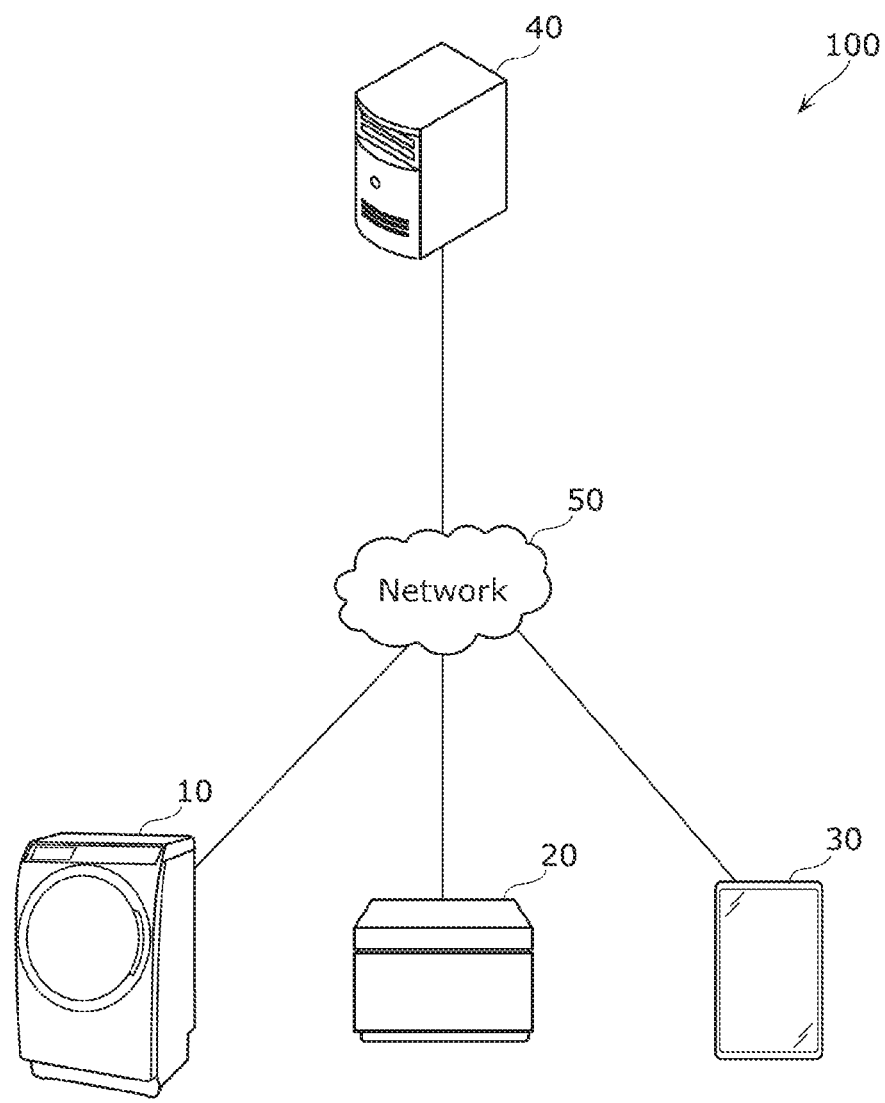
FIG. 1 is a diagram showing an outline of a presentation system according to an embodiment.

An outline of the presentation system according to an embodiment is described with reference to FIG. 1. FIG. 1 is a diagram showing the outline of the presentation system according to the embodiment.

As shown in FIG. 1, presentation system 100 according to the embodiment includes appliance 10, presentation device 20, information terminal 30, and server 40. Appliance 10, presentation device 20, information terminal 30, and server 40 are connected to one another via network 50 in a communicable manner. Network 50 may be a general line, such as the Internet, or may be a dedicated line. It should be noted that appliance 10 and presentation device 20 may be provided in the same house of a user, for example.

Appliance 10 is a household electric appliance to be used by a user and is a washing machine, for example. Appliance 10 sends an operation state of appliance 10 to server 40. For example, appliance 10 may send the operation state to server 40 at regular intervals or may send the operation state to server 40 at a timing when the operation state is changed. Although the description is given, in the present embodiment, based on a case in which appliance 10 is a washing machine, appliance 10 is not limited thereto. Appliance 10 may be an air conditioner, a microwave oven, a refrigerator, a rice cooker, a robot vacuum cleaner, an air cleaner, or any household electric appliance.

Presentation device 20 is a household electric appliance that is used by a user and has an utterance function of outputting voice, and is a smart speaker, for example. Presentation device 20 receives a notification from server 40 via network 50, and presents the notification. Presentation device 20 downloads and obtains sound source data from a sound source distribution server (not shown) based on a sound source uniform resource locator (URL) received from server 40 as a notification, for example. Then, presentation device 20 reproduces the sound source data distributed from the sound source distribution server, so as to output voice. In other words, presentation device 20 presents a notification to a user by outputting voice.

Although the description is given based on a case in which presentation device 20 that presents a notification to a user by outputting voice is a smart speaker in the present embodiment, presentation device 20 is not limited thereto. Presentation device 20 may be a robot vacuum cleaner or any household electric appliance that is equipped with a speaker, for example. Furthermore, presentation device 20 is not limited to present a notification to a user by outputting voice, and may present the notification to a user by displaying a character string or an image (video) on a display. In other words, presentation device 20 may be a television (TV), a smart display, a smartphone, a tablet terminal, or any appliance that is equipped with a display, for example.

Server 40 is a cloud server for controlling an utterance content (notification content) of presentation device 20. Server 40 determines the utterance content of presentation device 20, based on the operation state obtained from appliance 10 and a related status that relates to the operation state. Then, server 40 notifies presentation device 20 of a sound source URL relating to the determined utterance content. Accordingly, the sound source URL corresponds to information for allowing presentation device 20 to output the determined utterance content.

It should be noted that server 40 may send, to presentation device 20, sound source data that indicates the utterance content, instead of sending the sound source URL of the sound source data that indicates the utterance content, to presentation device 20. Furthermore, if presentation device 20 is a device that presents a notification to a user by displaying a character string or an image (video) on a display, server 40 may send a presentation URL for allowing presentation device 20 to access the presentation data indicating the character string or the image (video) that shows the notification content, or may send the presentation data to presentation device 20. When presentation device 20 receives the presentation URL, presentation device 20 may download the presentation data from a presentation data distribution server (not shown) and reproduce the downloaded presentation data, so as to display the character string or the image in the display.

Information terminal 30 serves as an operation terminal that is used by a user for setting the notification from server 40 to presentation device 20 to be turned off. Information terminal 30 creates a UI for accepting an operation performed by a user, accepts the operation performed by the user to the UI, and sends operation information that indicates the accepted operation to server 40. Server 40 changes setting of turning off the notification, according to operation information received from information terminal 30.

2. Functionality Configuration of Presentation System

Figure 2:
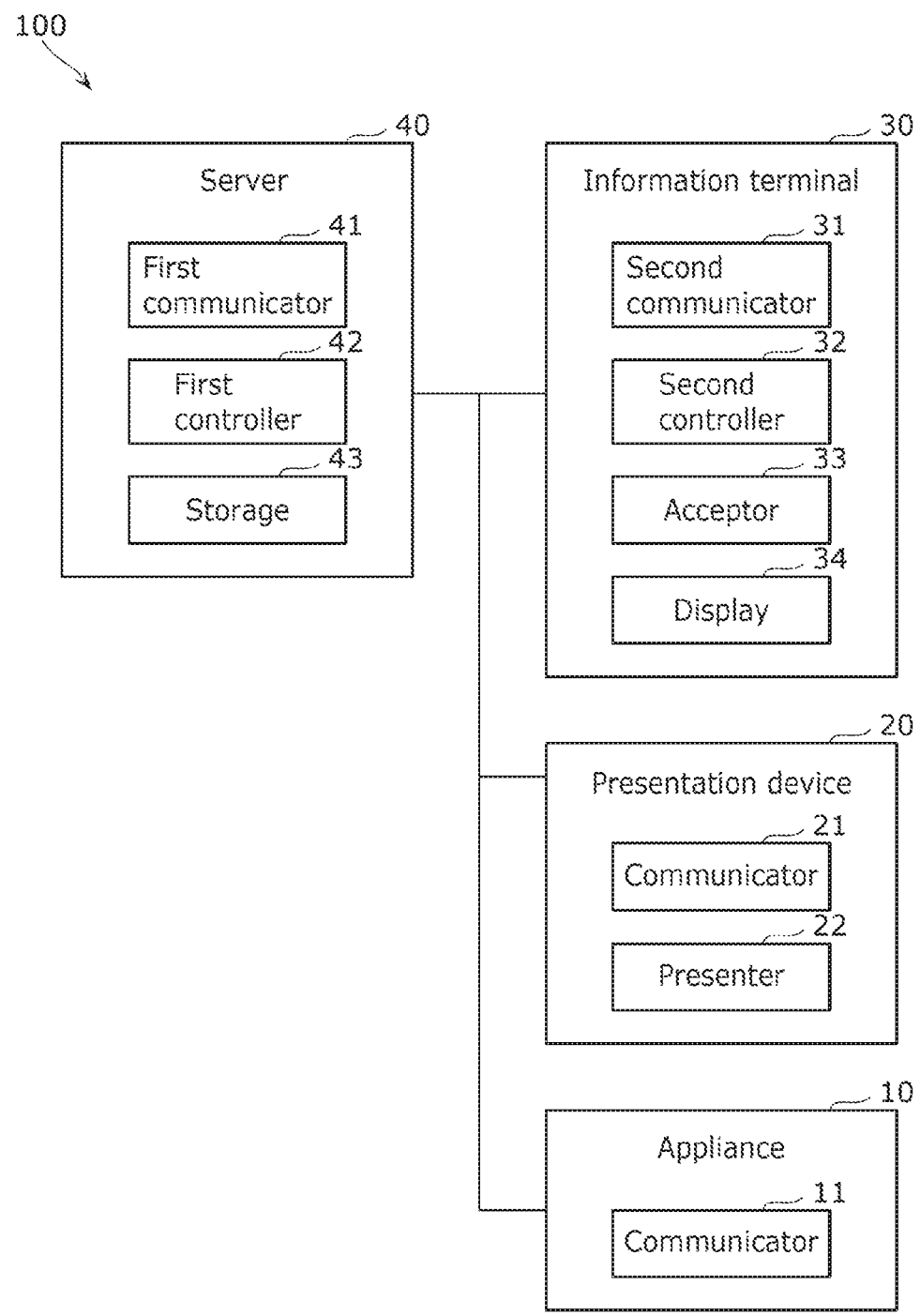
FIG. 2 is a block diagram showing a functionality configuration of the presentation system according to the embodiment.

Subsequently, a functionality configuration of presentation system 100 according to the embodiment is described with reference to FIG. 2. FIG. 2 is a block diagram showing a functionality configuration of the presentation system according to the embodiment.

(Appliance)

As shown in FIG. 2, appliance 10 includes communicator 11.

Communicator 11 sends, to server 40, operation information that indicates an operation state of appliance 10. The operation information includes date and time when the operation state is detected, a type of the operation state, the duration during which the operation state continues. Communicator 11 is embodied by a communication interface that can communicably connect to network 50. Specifically, communicator 11 communicably connects to network 50 by communicable connection with a base station of a mobile communication system. Communicator 11 may be embodied by a wireless communication interface that is suitable for a communication standard to be used in the mobile communication including, for example, a third generation mobile system communication system (3G), a fourth generation mobile communication system (4G), long term evolution (LTE: registered trademark), and a fifth generation mobile communication system (5G). Furthermore, communicator 11 may be embodied by a wireless local area network (LAN) interface that is suitable for IEEE 802.11a, b, g, n, ac standard, or may be embodied by a communication interface that is communicably connected to network 50 by communicable connection with an unillustrated router (e.g., a mobile wireless LAN router). Furthermore, communicator 11 may be embodied by a wired LAN interface.

(Presentation Device)

Presentation device 20 includes communicator 21 and presenter 22.

Communicator 21 receives a sound source URL notified by server 40. In addition, communicator 21 downloads sound source data that corresponds to the sound source URL from the sound source distribution server, based on the received sound source URL.

Communicator 21 is embodied by a communication interface that can connect to network 50 in a communicable manner. Specifically, communicator 21 communicably connects to network 50 by communicable connection with a base station of a mobile communication system. Communicator 21 may be embodied by a wireless communication interface that is suitable for the communication standard to be used in a mobile communication system including, for example, the third generation mobile communication system (3G), the fourth generation mobile communication system (4G), the LTE (registered trademark), and the fifth generation mobile communication system (5G). Furthermore, communicator 21 may be embodied by a wireless LAN interface that is suitable for the IEEE 802.11a, b, g, n, ac standard, or may be embodied by a communication interface that is communicably connected to network 50 by communicable connection with an unillustrated router (e.g., the mobile wireless LAN router). Furthermore, communicator 21 may be embodied by a wired LAN interface.

Presenter 22 presents a notification to a user by reproducing voice indicated by sound source data that has been downloaded from the sound source distribution server. Presenter 22 serves as a speaker, for example. Furthermore, presenter 22 is not limited to the presentation of the notification to a user by outputting voice, and may present the notification to a user by displaying a character string or an image (video) in a display. In this case, presenter 22 serves as a display, for example.

(Server)

Server 40 includes first communicator 41, first controller 42, and storage 43.

First communicator 41 communicates with presentation device 20 via network 50. First communicator 41 is embodied by a communication interface that can communicably connect to network 50. Specifically, first communicator 41 communicably connects to network 50 by communicable connection with a base station of a mobile communication system. First communicator 41 may be embodied by a wireless communication interface that is suitable for the communication standard to be used in a mobile communication system including, for example, the third generation mobile communication system (3G), the fourth generation mobile communication system (4G), the LTE (registered trademark), and the fifth generation mobile communication system (5G). Furthermore, first communicator 41 may be embodied by a wireless LAN interface that is suitable for the IEEE 802.11a, b, g, n, ac standard, or may be embodied by a communication interface that is communicably connected to network 50 by communicable connection with an unillustrated router (e.g., mobile wireless LAN router). Furthermore, first communicator 41 may be embodied by a wired LAN interface.

First controller 42 sends, to presentation device 20 via first communicator 41, a notification that has been associated in advance with a condition satisfied by the operation state of appliance 10, which has been obtained by appliance 10 via network 50. Specifically, first controller 42 compares the obtained operation state of appliance 10 with association information stored in storage 43.

Here, the association information is described with reference to FIG. 3. FIG. 3 is a diagram showing an example of the association information.

As shown in FIG. 3, in the association information, a plurality of conditions and a plurality of notification contents (scenarios) are associated with each other in one-to-one correspondence. Each of the plurality of conditions is defined by: a type of the appliance in which an operation state is generated; a range of the time and date at which the operation state is generated; a type of the operation state; a range of time duration in which the operation state continues; frequencies of the generation of the operation state; the number of times the operation state is generated; a combination of the operation states; and so on. Each of the plurality of notification contents is determined according to the corresponding one of the conditions. For example, the notification content may notify a user of completion of a single operation or a series of operations, of appliance 10, may notify a user of change in a detection state of a sensor included in appliance 10, or may notify a user of occurrence of an error in appliance 10.

First controller 42 refers to the association information stored in storage 43 to specify a condition to be satisfied by the obtained operation state of appliance 10 among a plurality of conditions included in the association information. First controller 42 specifies a notification content, which is associated with the specified condition in the association information, and sends a notification including the notification content to presentation device 20. As described above, the notification may include a sound source URL, may include sound source data, may include a presentation URL, or may include presentation data.

First controller 42 may be embodied by a processor and a memory that stores a program, or may be embodied by a dedicated circuit. In other words, first controller 42 may be embodied by software, or may be embodied by hardware.

Storage 43 stores the association information. Furthermore, storage 43 stores a history of notifications sent to presentation device 20.

Here, the history is described with reference to FIG. 4. FIG. 4 is a diagram showing an example of the history.

As shown in FIG. 4, the history includes date and time at which the notification is sent to presentation device 20, a content that is to be notified and is included in the sent notification, and a result that indicates whether the sent notification is presented by presentation device 20. The history may further include appliance information indicating an appliance from which an operation state is detected. The operation state is included in a condition with which the notification content is associated, in the association information. Storage 43 is embodied by a non-volatile storage device including, for example, a hard disk drive (HDD) and a solid state drive (SSD).

(Information Terminal)

Subsequently, a functionality configuration of information terminal 30 is described with reference to FIG. 2 again.

Information terminal 30 includes second communicator 31, second controller 32, acceptor 33, and display 34.

Second communicator 31 communicates with server 40 via network 50. Second communicator 31 is embodied by a communication interface that can communicably connect to network 50. Specifically, second communicator 31 communicably connects to network 50 by communicable connection with a base station of a mobile communication system. Second communicator 31 may be embodied by a wireless communication interface that is suitable for the communication standard to be used in a mobile communication system including, for example, the third generation mobile communication system (3G), the fourth generation mobile communication system (4G), the LTE (registered trademark), and the fifth generation mobile communication system (5G). Furthermore, second communicator 31 may be embodied by a local area network (LAN) interface that is suitable for the IEEE 802.11a, b, g, n, ac standard, or may be embodied by a communication interface that is communicably connected to network 50 by communicable connection with an unillustrated router (e.g., a mobile wireless LAN router).

Second controller 32 creates a user interface (UI) for accepting an operation performed by a user. The UI includes a history notified by server 40. Second controller 32 causes display 34 to display the created UI. Second controller 32 obtains a history from server 40 via second communicator 31, and creates the UI including the obtained history. Specifically, the UI created by second controller 32 includes an UI for accepting turning off a notification that is included in the history.

If the operation accepted by acceptor 33 indicates turning off a notification, second controller 32 sends turn-off information that indicates turning off the notification is accepted, to server 40 via second communicator 31. Second controller 32 may be embodied by a processor and a memory that stores a program, or may be embodied by a dedicated circuit. In other words, second controller 32 may be embodied by software, or may be embodied by hardware.

Acceptor 33 accepts an operation performed by a user. Acceptor 33 may be embodied by a touch panel, a touch pad, and so on, or may be embodied by a mouse, a keyboard, and so on.

Display 34 displays the UI created by second controller 32, an image, and so on. Display 34 may be unified with a touch panel.

Here, the UI is described with reference to FIGS. 5 to 9.

FIGS. 5 to 9 are diagrams showing specific examples of the UI.

Figure 5:
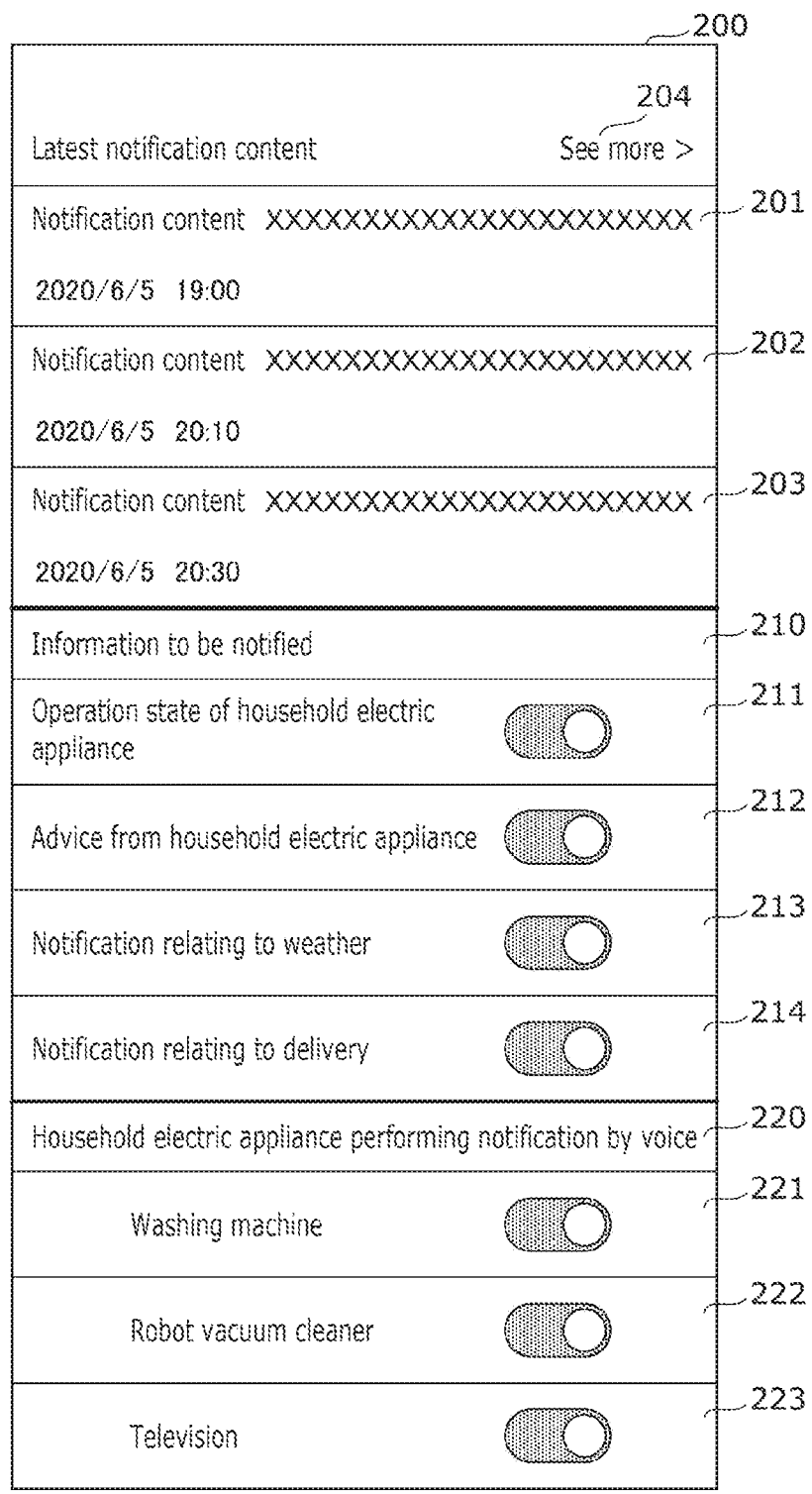
FIG. 5 is a diagram showing a specific example of a UI.

UI 200 shown in FIG. 5 includes histories 201 to 203, which have been notified by server 40. Histories 201 to 203 included in UI 200 correspond to the predetermined number of notification histories (three in the present embodiment) in the reverse chronological order from the newest notification history, among the notification histories. Histories 201 to 203 includes the notification content and date and time at which the notification is presented by presentation device 20.

UI 200 may include button 204 for switching to UI 300 that includes histories other than histories 201 to 203.

Furthermore, UI 200 includes second UI 210 and second UI 220 for accepting, all together, turning off a plurality of notifications respectively corresponding to a plurality of conditions, from a user.

Second UI 210 includes switches 211 to 214. Each of switches 211 to 214 accepts, all together, turning off a plurality of second notifications each of which is categorized in the corresponding one of the categories, i.e., the second notifications respectively belong to the categories, from a user. A plurality of second notifications each of which belongs to the corresponding one of the categories, are respectively associated with a plurality of second conditions. A plurality of second operation states of appliance 10, which respectively satisfy the plurality of second conditions, are respectively categorized into the categories, i.e., respectively belong to the categories. It should be noted that the categories include the operation state of a household electric appliance, advice from a household electric appliance, weather, and delivery.

Switch 211 accepts, all together, setting of turning on/off a plurality of notifications relating to the operation states of a household electric appliance. When switch 211 is switched to off, second controller 32 sends, to server 40 via second communicator 31, the turn-off information for setting a plurality of notifications relating to the operation states of a household electric appliance to be turned off, at once. When switch 211 is switched to on, second controller 32 sends, to server 40 via second communicator 31, turn-on information for setting a plurality of notifications relating to the operation states of the household electric appliance to be turned on, at once.

Switch 212 accepts, all together, setting of turning on/off a plurality of notifications relating to advice from a household electric appliance. When switch 212 is switched to off, second controller 32 sends, to server 40 via second communicator 31, the turn-off information for setting a plurality of notifications relating to the advice from a household electric appliance to be turned off, at once. When switch 212 is switched to on, second controller 32 sends, to server 40 via second communicator 31, the turn-on information for setting a plurality of notifications relating to the advice from the household electric appliance to be turned on, at once.

Switch 213 accepts, all together, setting of turning on/off a plurality of notifications relating to weather. When switch 213 is switched to off, second controller 32 sends, to server 40 via second communicator 31, the turn-off information for setting a plurality of notifications relating to the weather to be turned off, at once. When switch 213 is switched to on, second controller 32 sends, to server 40 via second communicator 31, the turn-on information for setting a plurality of notifications relating to the weather to be turned on, at once.

Switch 214 accepts, all together, setting of turning on/off a plurality of notifications relating to delivery. When switch 214 is switched to off, second controller 32 sends, to server 40 via second communicator 31, the turn-off information for setting a plurality of notifications relating to the delivery to be turned off, at once. When switch 214 is switched to on, second controller 32 sends, to server 40 via second communicator 31, the turn-on information for setting a plurality of notifications relating to the delivery to be turned on, at once.

First controller 42 of server 40 that has received the turn-off information, sets a plurality of notifications that belong to a category corresponding to the turn-off information to be turned off, at once. Even if server 40 obtains, from appliance 10, an operation state that satisfies one of the plurality of conditions respectively associated with the plurality of notifications indicated to be turned off in the turn-off information, first controller 42 does not send the notification that is associated with the one condition to presentation device 20. Server 40 that has received the turn-on information sets a plurality of notifications that belong to a category corresponding to the turn-on information to be turned on at once. If server 40 obtains from appliance 10 an operation state that satisfies one of the plurality of conditions respectively associated with a plurality of notifications indicated to be turned on in the turn-on information, server 40 sends the notification that is associated with the one condition to presentation device 20.

Second UI 220 includes switches 221 to 223. Each of switches 221 to 223 accepts, all together, turning off a plurality of third notifications each of which is categorized for each appliance, from a user. A plurality of third notifications each of which is categorized to the corresponding one of the appliances are respectively associated with a plurality of third conditions. A plurality of third operation states which are categorized to respective appliances 10 satisfy a plurality of conditions, and are categorized into the appliances. It should be noted that the appliances include a washing machine, an air conditioner, a microwave oven, a refrigerator, a rice cooker, a robot vacuum cleaner, an air cleaner, and so on.

Switch 221 accepts setting of turning on/off a plurality of notifications relating to operation states of a washing machine, at once. When switch 221 is switched to off, second controller 32 sends, to server 40 via second communicator 31, turn-off information for setting the plurality of notifications relating to the operation states of the washing machine to be turned off, at once. When switch 221 is switched to on, second controller 32 sends, to server 40 via second communicator 31, turn-on information for setting the plurality of notifications relating to the operation states of the washing machine to be turned on, at once.

Switch 222 accepts setting of turning on/off a plurality of notifications relating to operation states of a robot vacuum cleaner, at once. When switch 222 is switched to off, second controller 32 sends, to server 40 via second communicator 31, the turn-off information for setting the plurality of notifications relating to the operation states of the robot vacuum cleaner to be turned off, at once. When switch 222 is switched to on, second controller 32 sends, to server 40 via second communicator 31, the turn-on information for setting the plurality of notifications relating to the operation states of the robot vacuum cleaner to be turned on, at once.

Switch 223 accepts setting of turning on/off a plurality of notifications relating to operation states of a television, at once. When switch 223 is switched to off, second controller 32 sends, to server 40 via second communicator 31, the turn-off information for setting the plurality of notifications relating to the operation states of the television to be turned off, at once. When switch 223 is switched to on, second controller 32 sends, to server 40 via second communicator 31, the turn-on information for setting the plurality of notifications relating to the operation states of the television to be turned on, at once.

First controller 42 of server 40 that has received the turn-off information sets a plurality of notifications relating to the appliance to which the turn-off information corresponds to be turned off, at once. Even if server 40 obtains, from appliance 10, an operation state that satisfies one of the plurality of conditions respectively associated with the plurality of notifications indicated to be turned off in the turn-off information, first controller 42 does not send the notification associated with the one condition to presentation device 20. First controller 42 of server 40 that has received the turn-on information sets the plurality of notifications that relate to the appliance corresponding to the turn-on information to be turned on, at once. If server 40 obtains from appliance 10 an operation state that satisfies one of the plurality of conditions respectively associated with the plurality of notifications indicated to be turned on in the turn-on information, first controller 42 sends the notification associated with the one condition to presentation device 20.

When button 204 is pushed, second controller 32 switches UI 200 displayed in display 34 to UI 300.

UI 300 shown in FIG. 6 includes a plurality of histories 301. The plurality of histories 301 includes histories same as histories 201 to 203, and histories of notifications which have been presented by presentation device 20 before histories 201 to 203 are presented.

When a selection of one history 301 among a plurality of histories 301 is accepted, second controller 32 switches UI 300 displayed in display 34 to UI 400.

Figure 7:
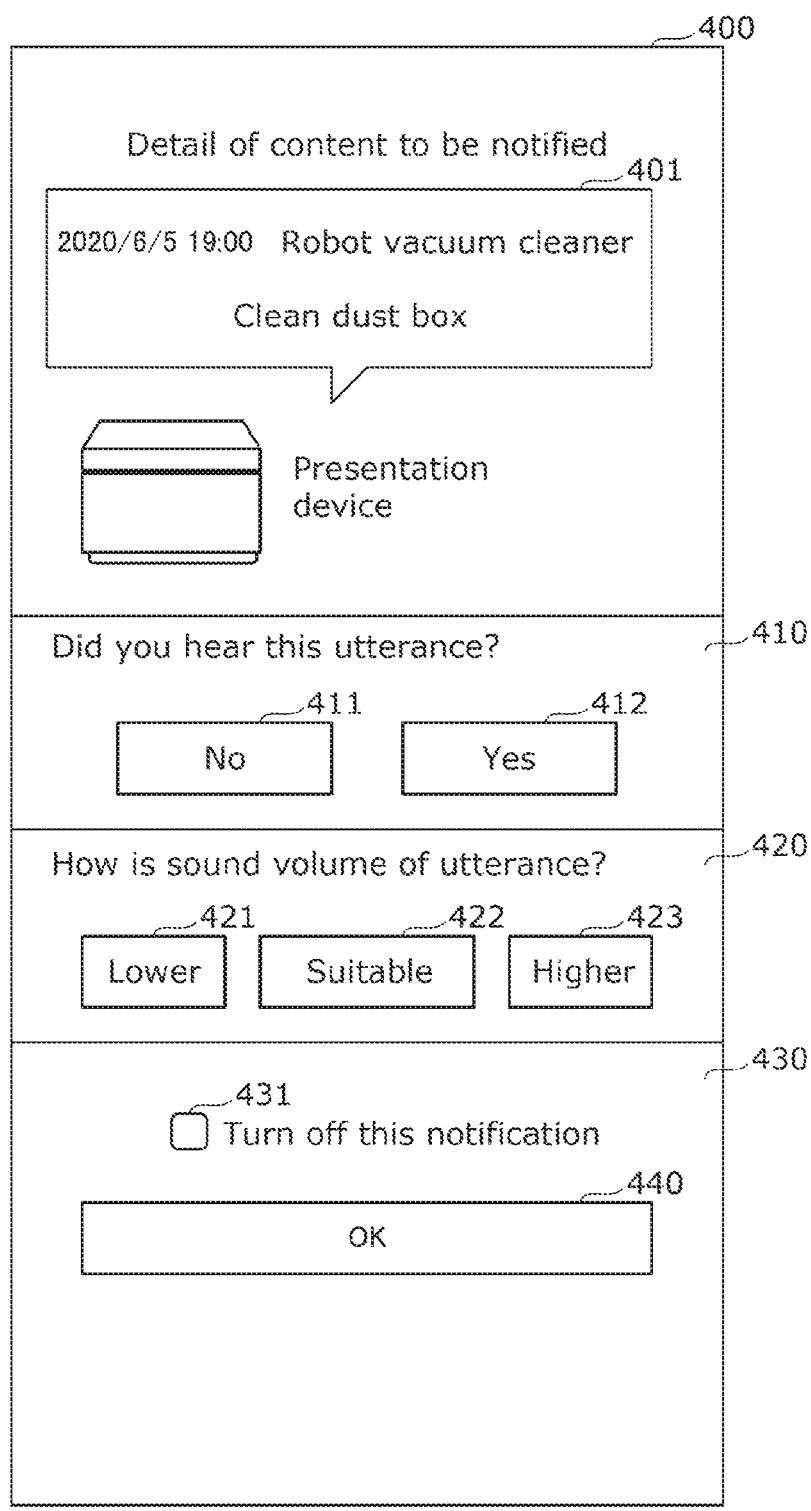
FIG. 7 is a diagram showing a specific example of the UI.

UI 400 shown in FIG. 7 includes notification 401, third UI 410, forth UI 420, first UI 430, and OK button 440.

Notification 401 indicates a notification content, which is included in one history 301 that has been selected.

Third UI 410 accepts, from a user, whether the user confirms a presented notification. Third UI 410 includes button 411 for accepting from a user that the user does not confirm the presented notification, and button 412 for accepting from a user that the user confirms the presented notification. When OK button 440 is entered under a condition that button 411 has been pushed, i.e., if the operation accepted by acceptor 33 indicates that a user does not confirm a notification, second controller 32 sends, to server 40 via second communicator 31, unconfirmation information indicating that the user does not confirm the notification. When OK button 440 is entered under a condition that button 412 has been pushed, i.e., if the operation accepted by acceptor 33 indicates that the user confirms the notification, second controller 32 sends, to server 40 via second communicator 31, information indicating that the user confirms the notification.

First controller 41 of server 40 that has received the unconfirmation information may send a notification notifying a user of availability of setting for resending the same notification to presentation device 20, to presentation device 20 or information terminal 30.

Fourth UI 420 accepts from a user a sound volume suitability operation that indicates whether a sound volume of a notification presented by voice of presentation device 20 is an optimal volume, higher than the optimal volume, or lower than the optimal volume. Fourth UI 420 includes button 421 for accepting from a user that the sound volume of the notification is lower than the optimal volume, button 422 for accepting from a user that the sound volume is the optimal volume, and button 423 for accepting that the sound volume is higher than the optimal volume. When OK button 440 is entered under a condition that button 421 has been pushed, second controller 32 sends, to server 40 via second communicator 31, sound volume suitability information indicating that an operation showing the sound volume being higher than the optimal volume is accepted. When OK button 440 is entered under a condition that button 422 has been pushed, second controller 32 sends, to server 40 via second communicator 31, the sound volume suitability information indicating that an operation showing the sound volume being optimal is accepted. When OK button 440 is entered under a condition that button 423 has been pushed, second controller 32 sends, to server 40 via second communicator 31, the sound volume suitability information indicating that the operation showing the sound volume being lower than the optimal volume is accepted. Thus, second controller 32 sends, to server 40 via second communicator 31, the sound volume suitability information indicating the sound volume suitability operation accepted by accepter 33.

When the operation showing that the volume is higher than the optimal volume is accepted, according to the sound volume suitability information, first controller 42 of server 40 that has received the sound volume suitability information sends, to presentation device 20, setting information for setting the sound volume of the notification by presentation device 20 to be turned down. When the operation showing that the volume is lower than the optimal volume is accepted, according to the sound volume suitability information, first controller 42 of server 40 sends, to presentation device 20, setting information for setting the sound volume of the notification by presentation device 20 to be turned up. When the operation showing that the volume is the optimal volume is accepted, according to the sound volume suitability information, first controller 42 of server 40 performs nothing.

First UI 430 accepts, from a user, turning off a notification associated with one condition. First UI 430 includes checkbox 431 for accepting, from a user, turning off notification 401 that is included in one history 301. When OK button 440 is entered under a condition that checkbox 431 is checked, second controller 32 sends, to server 40 via second communicator 31, the turn-off information indicating that a notification corresponds to the one condition that is associated with notification 401 is turned off.

First controller 42 of server 40 that has received the turn-off information, does not send the notification to presentation device 20, even if first controller 42 obtains from appliance 10 an operation state that satisfies a condition associated with the notification indicated to be turned off in the turn-off information.

Figure 8:
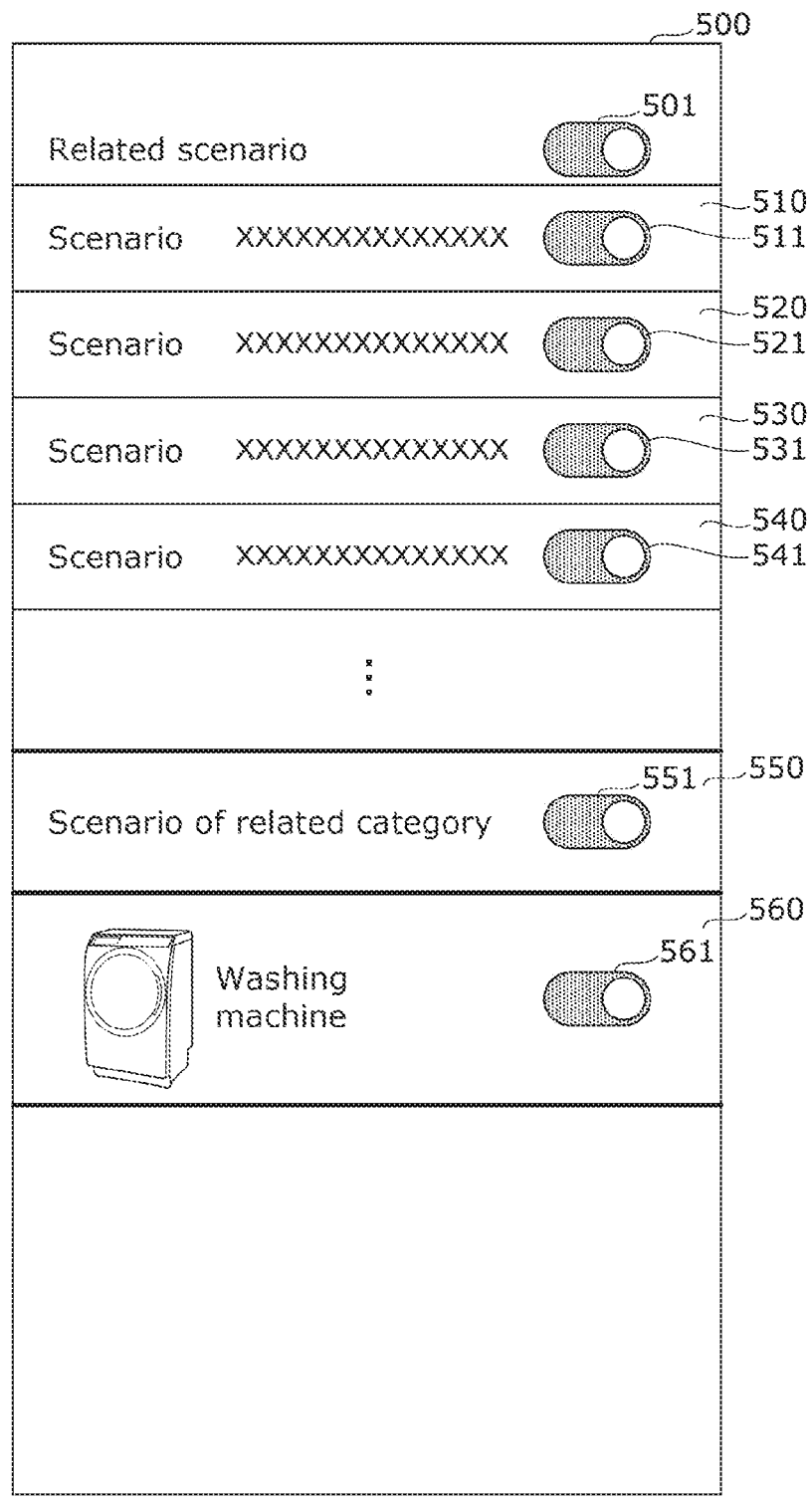
FIG. 8 is a diagram showing a specific example of the UI.

Second controller 32 may cause display 34 to display UI 500 shown in FIG. 8. UI 500 includes switch 501 for accepting, from a user, turning off a plurality of first notifications 510, 520, 530, and 540 respectively associated with a plurality of first conditions. A plurality of first operation states of appliance 10, which respectively satisfy the plurality of first conditions respectively associated with a plurality of first notifications 510, 520, 530, and 540 relate to one another. The plurality of first notifications 510, 520, 530, and 540 may be notifications that relate to notifications included in one history 301 that has been selected, for example. The operation states that relate to one another may be a plurality of operation states detected in the same operation. The operation states that relate to one another may be a plurality of operation states detected in a washing step in a washing machine, or may be a plurality of operation states detected in a drying step of the washing machine.

UI 500 may include switches 511, 521, 531, and 541 for setting turning on/off the plurality of first notifications 510, 520, 530, and 540, respectively.

UI 500 includes UI 550 and UI 560. UI 550 includes switch 551 for turning on/off a plurality of notifications included in the category relating to one history 301 that has been selected, at once. UI 560 includes switch 561 for accepting from a user, all together, turning on/off a plurality of notifications categorized in an appliance from which an operation state of one history 301 that has been selected is detected.

Figure 9:
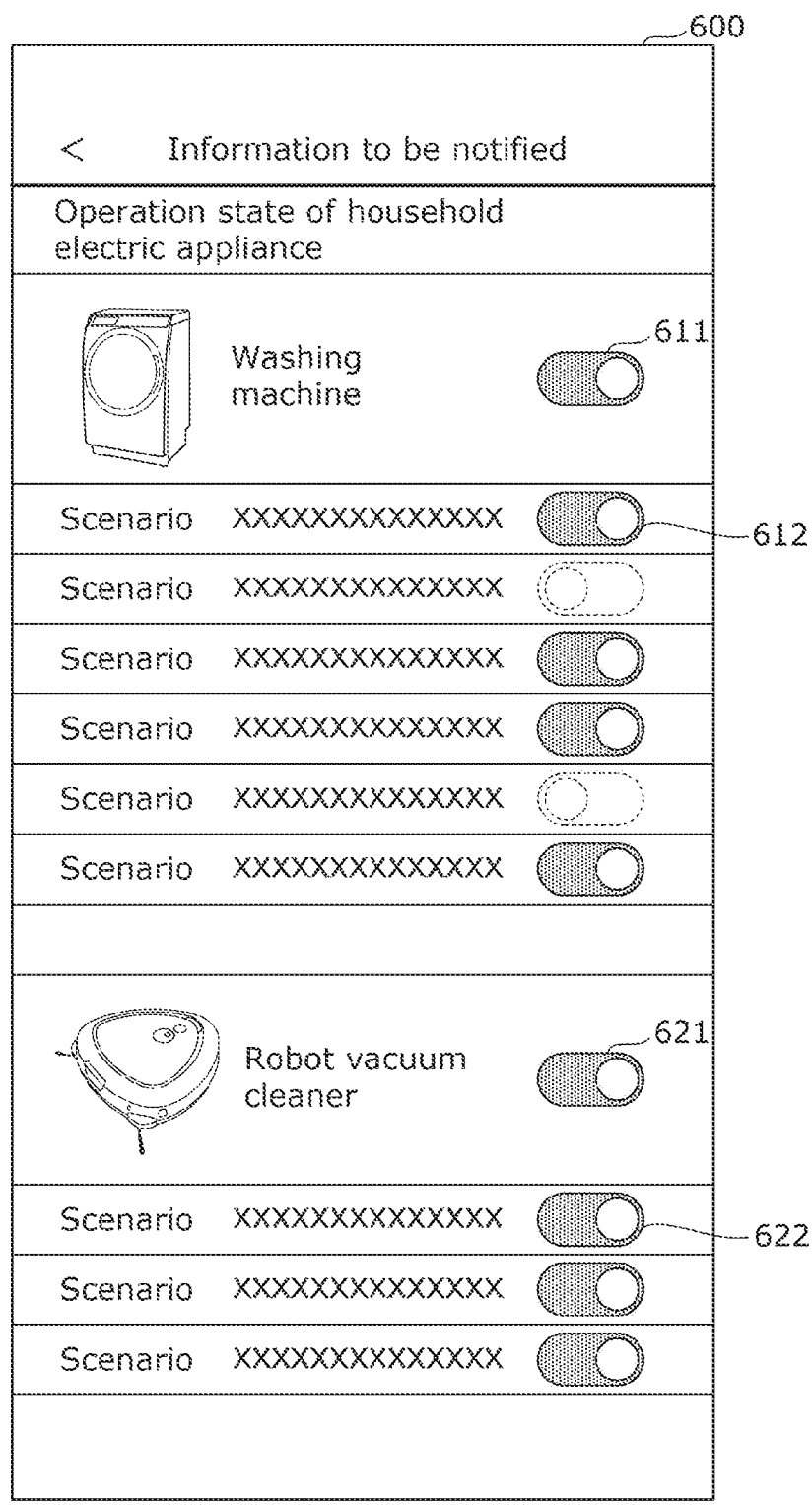
FIG. 9 is a diagram showing a specific example of the UI.

Second controller 32 may cause display 34 to display the UI for accepting, from a user, the setting of turning on/off the notifications from the notified history, as described in relation to UI 200, 300, 400, and 500, which are shown in FIGS. 5 to 8. Second controller 32 may also cause display 34 to display UI 600 for performing notification setting, as shown in FIG. 9.

UI 600 sets turning on/off each of a plurality of notifications in each appliance. UI 600 includes switch 611 for setting, at once, turning on/off the notifications from a washing machine, switch 612 for setting turning on/off each of one or more notifications from the washing machine, switch 621 for setting, at once, turning on/off notifications from a robot vacuum cleaner, and switch 622 for setting turning on/off each of one or more notifications from the robot vacuum cleaner.

3. Operation of Presentation System

Then, an operation of a presentation system is described.

Figure 10:
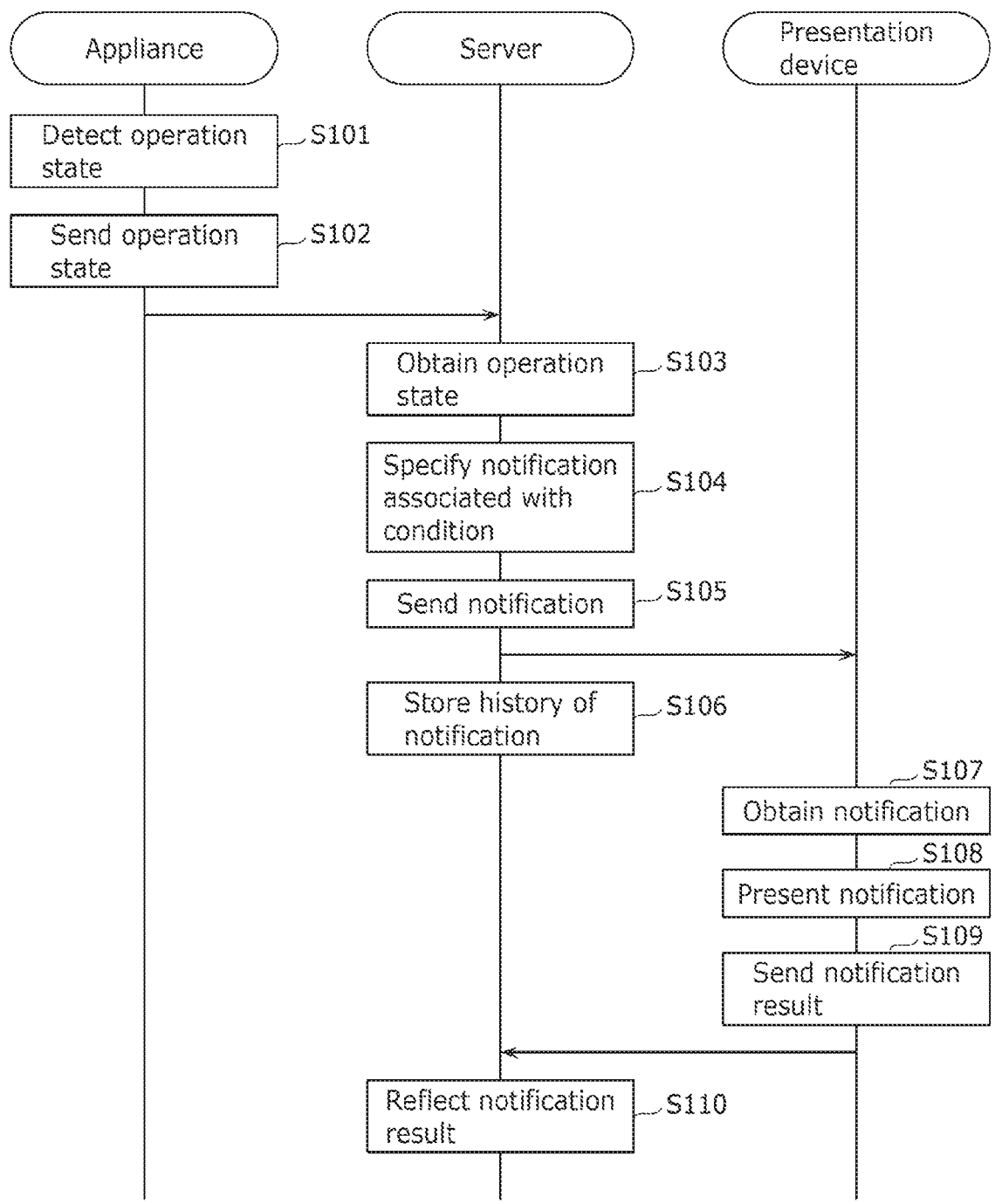
FIG. 10 is a sequence diagram showing presentation processing performed by a presentation system.

FIG. 10 is a sequence diagram for presentation processing performed by the presentation system.

Appliance 10 detects an operation state of appliance 10 (Step S101).

Then, appliance 10 sends the detected operation state to server 40 (Step S102).

Server 40 obtains the operation state from appliance 10 (Step S103).

Subsequently, server 40 specifies a notification that has been associated in advance with a condition that is satisfied by the obtained operation state (Step S104).

Then, server 40 sends the specified notification to presentation device 20 (Step S105).

Then, server 40 stores a history of the notifications sent to presentation device 20 (Step S106).

Presentation device 20 obtains a notification from server 40 (Step S107).

Then, presentation device 20 presents the obtained notification (Step S108).

Subsequently, presentation device 20 sends a notification result of the presented notifications to server 40 (Step S109).

Server 40 reflects the notification result obtained from presentation device 20 (Step S110). Specifically, server 40 changes a result corresponding to the obtained notification result in the history stored in storage 43 to a value indicating that the notification is presented by presentation device 20.

Figure 11:
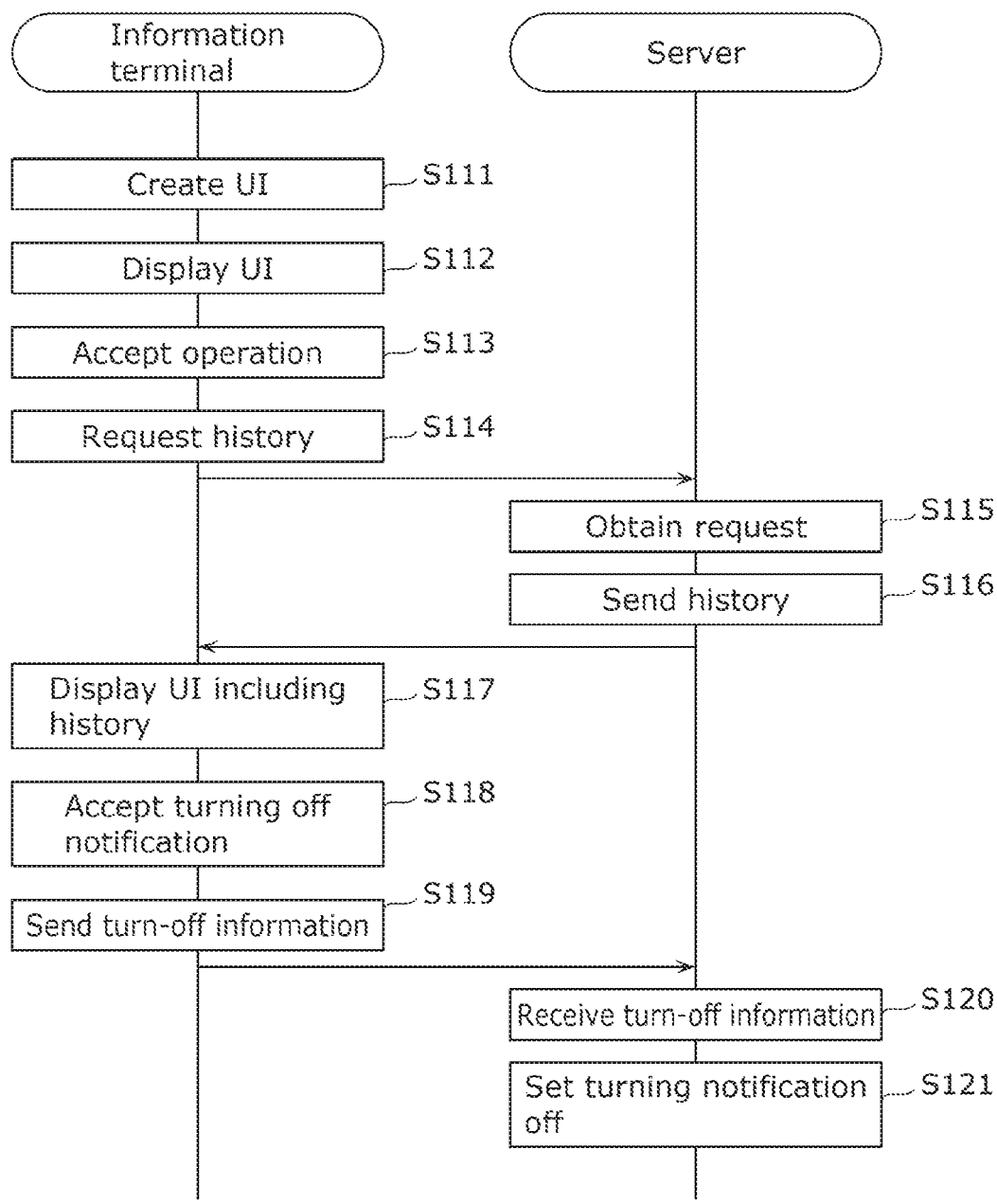
FIG. 11 is a sequence diagram showing notification setting processing performed by the presentation system.

FIG. 11 is a sequence diagram for notification setting processing performed by the presentation system.

Information terminal 30 creates a UI (Step S111), and causes display 34 to display the created UI (Step S112).

Subsequently, information terminal 30 accepts an operation for requesting a history of notifications, from a user (Step S113).

Then, information terminal 30 requires a history according to the operation (Step S114). In other words, information terminal 30 sends a request of the history to server 40.

Server 40 obtains the request of the history from information terminal 30 (Step S115).

Then, server 40 sends the history to information terminal 30 in response to the request of the history (Step S116).

Information terminal 30 obtains the history, and displays an UI including the obtained history (Step S117).

Subsequently, information terminal 30 accepts an operation of turning off a notification, from a user (Step S118).

Then, information terminal 30 sends turn-off information indicating that turning off the notification has been accepted, to server 40 (Step S119).

Server 40 receives the turn-off information (Step S120), and sets a notification indicated to be turned off in the turn-off information to be turned off (S121).

Figure 12:
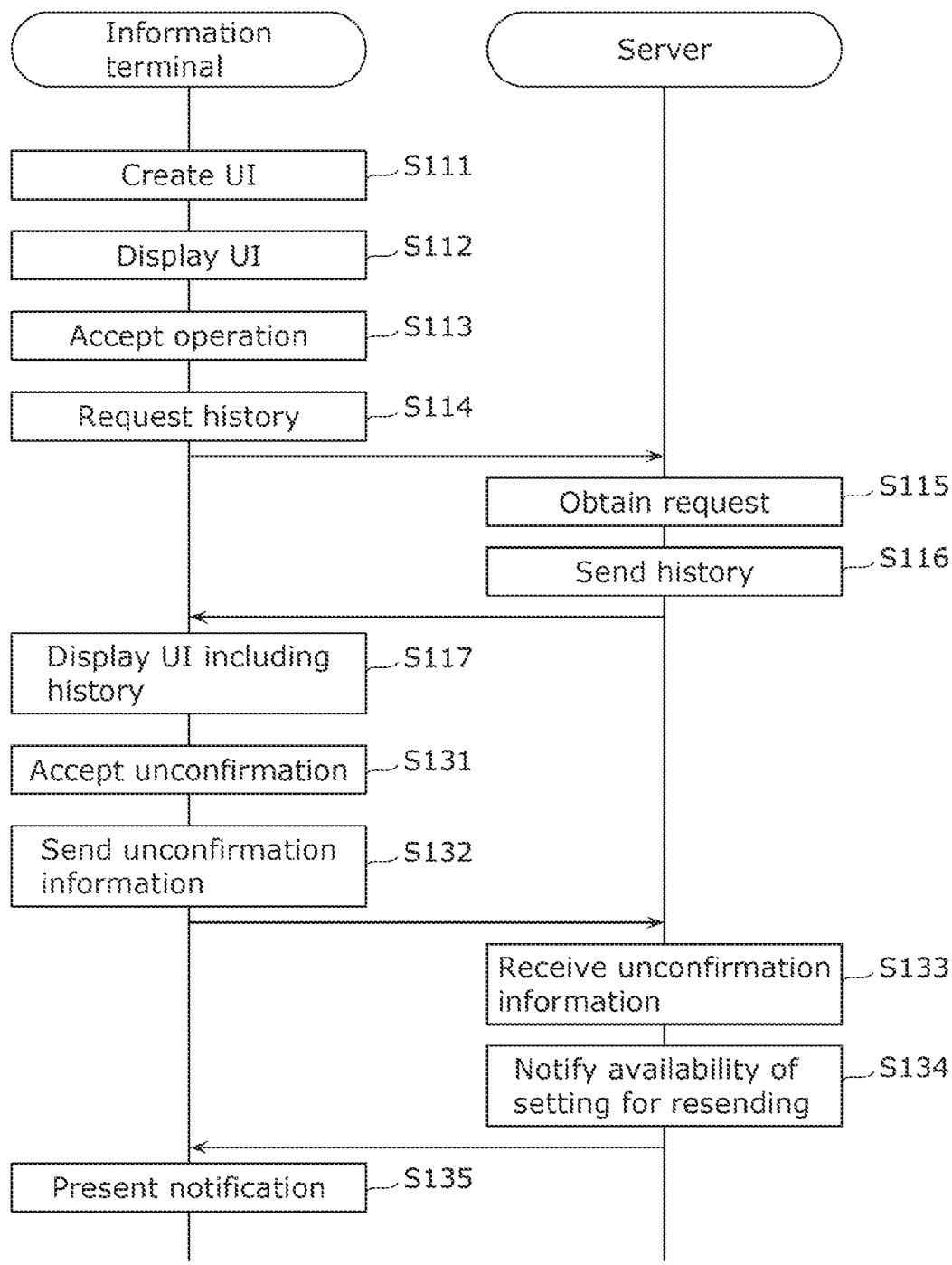
FIG. 12 is a sequence diagram showing unconfirmation inquiry processing performed by the presentation system.

FIG. 12 is a sequence diagram that shows unconfirmation inquiry processing performed by the presentation system.

Processing in Steps S111 to S117 is the same as those shown in FIG. 11, so that description of the processing is omitted.

Subsequent to Step S117, information terminal 30 accepts an operation showing that the notification is not confirmed by a user (Step S131).

Then, information terminal 30 sends, to server 40, the unconfirmation information indicating that the notification is not confirmed by the user (Step S132).

Server 40 receives the unconfirmation information from information terminal 30 (Step S133).

Then, server 40 notifies information terminal 30 of availability of setting for resending a notification relating to the unconfirmation information (Step S134). According to the resending setting, a notification same as a notification relating to the unconfirmation information is sent again to presentation device 20.

Information terminal 30 notifies a user of the availability of the setting for resending the notification relating to the unconfirmation information (Step S135).

Figure 13:
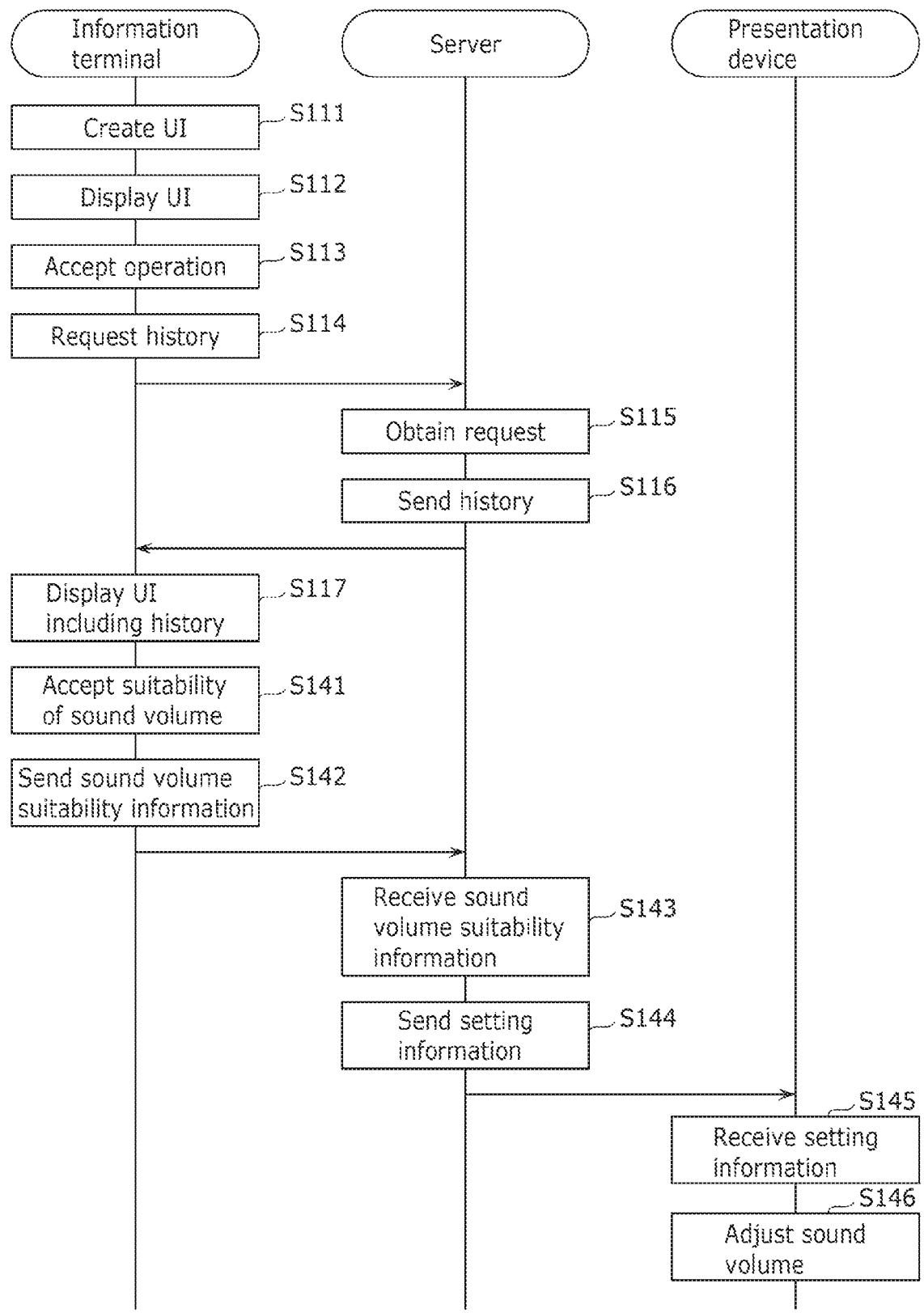
FIG. 13 is a sequence diagram showing sound volume adjustment processing performed by the presentation system.

FIG. 13 is a sequence diagram for sound volume adjustment processing by the presentation system.

Processing in Steps S111 to S117 is the same as those shown in FIG. 11, so that description of the processing is omitted.

Information terminal 30 accepts, subsequent to Step S117, a sound volume suitability operation showing whether a sound volume of a notification presented by voice is an optimal volume, higher than the optimal volume, or lower than the optimal volume (Step S141).

Then, information terminal 30 sends, to server 40, sound volume suitability information that indicates the sound volume suitability operation (Step S142).

Server 40 receives the sound volume suitability information from information terminal 30 (Step S143).

Subsequently, server 40 sends, to presentation device 20, setting information determined based on the sound volume suitability information (Step S144).

Presentation device 20 receives the setting information from server 40 (Step S145).

Subsequently, presentation device 20 adjusts the sound volume of the notification according to the setting information (Step S146).

4. Effects and so on

Presentation system 100 according to the present embodiment includes server 40, presentation device 20, and information terminal 30. Presentation device 20 and information terminal 30 are connected to server 40 via network 50. Server 40 includes first communicator 41, first controller 42, and storage 43. First communicator 41 communicates with presentation device 20 via network 50. First controller 42 sends, to presentation device 20 via first communicator 41, a notification that has been associated in advance with a condition satisfied by an operation state of appliance 10, which is obtained from appliance 10 via network 50. Storage 43 stores a history of notifications that have been sent to presentation device 20. Presentation device 20 receives a notification from server 40 via network 50, and presents the notification. Information terminal 30 includes display 34, acceptor 33, second communicator 31, and second controller 32. Acceptor 33 accepts an operation performed by a user. Second communicator 31 communicates with server 40 via network 50. Second controller 32 creates a user interface (UI) for accepting the operation, and causes display 34 to display the UI. Second controller 32 obtains the history from server 40 via second communicator 31. The UI includes the obtained history and accepts turning off a notification included in the history.

According to the above, the UI including the history accepts turning off the notification that is included in the history. Accordingly, a user can easily set the notification that is determined as unnecessary with reference to the history to be turned off.

In presentation system 100, if the operation accepted by acceptor 33 indicates turning off the notification, second communicator 32 sends turn-off information that indicates turning off the notification is accepted, to server 40 via second communicator 31. First controller 42 of server 40 that has received the turn-off information via first communicator 41 does not send a notification to presentation device 20, even if an operation state that satisfies a condition associated with the notification indicated to be turned off in the turn-off information is obtained from appliance 10.

Therefore, a user sets turning off the notification that is determined as unnecessary with reference to the history, so as to prevent the notification from being notified by presentation device 20.

Furthermore, in presentation system 100, the UI includes first UI 430 for accepting, from a user, turning off a notification associated with one condition. Therefore, a user can set to individually turn off each of the notifications.

Furthermore, in presentation system 100, UI includes second UI 220 for accepting, from a user, turning off a plurality of notifications respectively corresponding to a plurality of conditions, at once. Therefore, a user can set to turn off the plurality of notifications, at once.

Furthermore, in presentation system 100, the plurality of notifications include a plurality of first notifications. A plurality of first operation states of appliance 10, which satisfy a plurality of first conditions respectively associated with the plurality of first notifications, are operation states that are related with one another. Therefore, a user can set to turn off the plurality of first notifications related to one another, at once.

Furthermore, in presentation system 100, the plurality of notifications include a plurality of second notifications. A plurality of second operation states of appliance 10, which satisfy a plurality of second conditions respectively associated with the plurality of second notifications, are operation states that are each categorized in the corresponding one of the categories. Therefore, a user can set to turn off the plurality of second notifications categorized in each category, at once.

Furthermore, in presentation system 100, the plurality of notifications include a plurality of third notifications. A plurality of third operation states of appliance 10, which satisfy a plurality of third conditions respectively associated with the plurality of third notifications, are operation states that are each categorized in the corresponding one of the appliances. Therefore, a user can set to turn off the plurality of third notifications categorized in each appliance, at once.

Furthermore, in presentation system 100, the UI includes third UI 410 for accepting, from a user, whether the user has confirmed a presented notification. When the operation accepted by acceptor 33 shows that the notification is not confirmed, second controller 32 sends, to server 40 via second communicator 31, unconfirmation information indicating that the notification is not confirmed. First controller 42 of server 40 may send, to presentation device 20 or information terminal 30, a notification of notifying a user of availability of setting for resending the same notification to presentation device 20.

Accordingly, in a case when there is a notification that has not been confirmed by a user, the user can be notified of availability of setting for resending the same notification to presentation device 20. Therefore, it can be reduced that a notification necessary for a user is not confirmed.

Furthermore, in presentation system 100, presentation device 20 presents a notification by voice. The UI includes fourth UI 420 that accepts, from a user, a sound volume suitability operation that shows whether a sound volume of the notification presented by voice is an optimal volume, higher than the optimal volume, or lower than the optimal volume. Second controller 32 sends, to server 40 via second communicator 31, sound volume suitability information that indicates the sound volume suitability operation accepted by accepter 33. If the sound volume suitability information indicates the volume is higher than the optimal volume, first controller 42 of server 40 sends, to presentation device 20, setting information for setting the sound volume of the notification by presentation device 20 to be turned down. If the sound volume suitability information indicates the sound volume is lower than the optimal volume, first controller 42 sends, to presentation device 20, setting information for setting the sound volume of the notification by presentation device 20 to be turned up.

Accordingly, the sound volume of the notification by voice can be adjusted to a sound volume according to evaluation of the sound volume by a user. Therefore, the sound volume can be adjusted to a proper volume depending on users.

5. Modified Example (1)

Although information terminal 30 accepts setting of turning on/off a notification for a single user in the above embodiments, turning on/off a notification may be set for each one of a plurality of users. For example, presentation device 100 may include another information terminal connected to server 40 via network 50. The other information terminal includes another display, another acceptor for accepting another operation performed by another user, another second communicator that communicates with server 40 via network 50, and another second controller that creates another user interface (UI) for accepting another operation and allows the other display to display the other UI. The other second controller obtains a history from server 40 via another second communicator. The other UI includes the obtained history and accepts turning off a notification included in the obtained history, for the other user.

In other words, information terminal 30 is a terminal for accepting setting of turning on/off a notification for a user, whereas the other information terminal accepts setting of turning on/off a notification for another user. Server 40 accepts setting of turning on/off the notification accepted from information terminal 30, as setting for the user. In addition, server 40 accepts setting of turning on/off the notification accepted from another information terminal, as setting for another user.

(2)

Although presentation system 100 according to the embodiments described above includes, as an example, one appliance 10, presentation system 100 may include a plurality of appliances 10.

(3)

In presentation system 100 according to the embodiments described above, information terminal 30 may have functions similarly to those of presenter 22 of presentation device 20. In other words, information terminal 30 may receive a notification from server 40, and may present the received notification to a user. Furthermore, presentation device 20 may have a function of providing a user with a UI that accepts setting of turning on/off a notification of information terminal 30.

Others

In the embodiments and the modifications thereof, which are described above, each of the structural components may be configured by dedicated hardware or may be embodied by executing a software program suitable for each of the structural components. Each of the structural components may be embodied in a manner that a program executor, such as a CPU and a processor, reads and executes a software program recorded in a hard disk, a semiconductor memory, or such a recording medium.

As described above, embodiments are described as examples of the technique in the present disclosure. For the description, attached drawings and detailed description are provided.

Therefore, structural components described in the accompanying drawings and the detailed description may include not only structural components that are necessary for solving problems, but also structural components that are not necessary for solving the problems, for exemplifying the above technique. Accordingly, it should not be immediately recognized that those unnecessary structural components are necessary, based on that those unnecessary structural components are described in the accompanied drawings and the detailed description.

Since the embodiments above are described for exemplifying the technique in the present disclosure, various modifications, replacement, addition, omission, and so on can be conducted in the scope of claims and in a scope equivalent thereto.

INDUSTRIAL APPLICABILITY

The present disclosure is applicable to, for example, a presentation system that allows a user to easily set turning off a notification.

The invention claimed is:

1. A presentation system comprising a server, a presentation device, and an information terminal, the presentation device and the information terminal being connected to the server via a network, wherein:
the server includes:
a first communication interface that includes a wireless or a wired interface and communicates with the presentation device via the network;
a first processor that sends, to the presentation device via the first communication interface, a voice notification presented by voice that has been associated in advance with a condition satisfied by an operation state of each of one or more appliances, the operation state being obtained from a corresponding one of the one or more appliances via the network; and
a storage that stores a history of the voice notification presented by the presentation device which has been sent to the presentation device,
the presentation device receives the voice notification from the server via the network, and presents the notification,
the information terminal includes:
a display;
a user input device that includes a touch panel or a touch pad and accepts an operation performed by a user;
a second communication interface that includes a wireless or a wired interface and communicates with the server via the network; and
a second processor that creates a user interface (UI) for accepting the operation, and causes the display to display the UI,
the second processor obtains the history of the voice notification presented by the presentation device from the server via the second communication interface, and
the UI includes the history of the voice notification presented by the presentation device which has been obtained and accepts turning off the notification included in the history of the voice notification presented by the presentation device.

2. The presentation system according to claim 1, wherein; when the operation accepted by the user input device indicates turning off the voice notification, the second processor sends, to the server via the second communication interface, turn-off information indicating that the turning off the voice notification has been accepted, and when the first processor of the server obtains the turn-off information via the first communication interface, the first processor does not send the voice notification to the presentation device even under a state that the operation state satisfying the condition associated with the voice notification indicated to be turned off in the turn-off information is obtained from the one or more appliances.

3. The presentation system according to claim 1, wherein the UI includes a first UI for accepting, from a user, turning off a voice notification associated with a single condition.

4. The presentation system according to claim 1, wherein the UI includes a second UI for accepting, from a user, turning off a plurality of voice notifications respectively associated with a plurality of conditions, at once, the plurality of voice notifications including the voice notification, and the plurality of conditions including the condition.

5. The presentation system according to claim 4, wherein;
the plurality of voice notifications include a plurality of first voice notifications, and
a plurality of first operation states of at least one of the one or more appliances relate to one another, each of the first operation states satisfying at least one of a plurality of first conditions respectively associated with the plurality of first voice notifications.

6. The presentation system according to claim 4, wherein;
the plurality of voice notifications include a plurality of second voice notifications, and
a plurality of second operation states of at least one of the one or more appliances are each categorized in a corresponding one of categories, each of the second operation states satisfying at least one of a plurality of second conditions respectively associated with the plurality of second voice notifications.

7. The presentation system according to claim 4, wherein:
the plurality of voice notifications include a plurality of third voice notifications, and
a plurality of third operation states of at least one of the one or more appliances are each categorized in a corresponding one of the appliances, each of the third operation states satisfying at least one of a plurality of third conditions respectively associated with the plurality of third voice notifications.

8. The presentation system according to claim 1, wherein;
the UI includes a third UI for accepting, from a user, whether the voice notification presented has been confirmed,
when the operation accepted by the user input device shows that the voice notification has not been confirmed, the second processor sends unconfirmation information indicating that the voice notification has not been confirmed, to the server via the second communication interface, and
the first processor of the server sends, to one of the presentation device and the information terminal, a notification for notifying the user of availability of a setting for resending, to the presentation device, a voice notification same as the voice notification presented.

9. The presentation system according to claim 1, wherein:
the presentation device presents the voice notification by voice,
the UI includes a fourth UI that accepts from a user a sound volume suitability operation that shows whether a sound volume of the voice notification is an optimal volume, higher than the optimal volume, or lower than the optimal volume, the second processor sends sound volume suitability information that indicates the sound volume suitability operation accepted by the user input device, to the server via the second communication interface, and the first processor of the server:
sends, to the presentation device, setting information for setting the sound volume of the voice notification by the presentation device to be turned down, when the sound volume suitability information indicates that the sound volume is higher than the optimal volume; and sends, to the presentation device, setting information for setting the sound volume of the voice notification by the presentation device to be turned up, when the sound volume suitability information indicates that the sound volume is lower than the optimal volume.

10. The presentation system according to claim 1, further comprising:
another information terminal that is connected to the server via the network, wherein:
the other information terminal includes:
another display;
another user input device that includes a touch panel or a touch pad and accepts another operation performed by another user;
another second communication interface that includes a wireless or a wired interface and communicates with the server via the network; and
another second processor that creates another user interface (UI) for accepting the other operation, and causes the another display to display the another UI,
the another second processor obtains the history from the server via the another second communicator, and
the another UI includes the history obtained and accepts the turning off a voice notification included in the history, for the another user.

11. An information terminal in a presentation system that includes a server, a presentation device, and the information terminal, the presentation device and the information terminal being connected to the server via a network,
the information terminal comprising:
a display;
an user input device that includes a touch panel or a touch pad and accepts an operation performed by a user;
a second communication interface that includes a wireless or a wired interface and communicates with the server via the network; and a second processor that creates a user interface (UI) for accepting the operation, and causes the display to display the UI, wherein:
the second processor obtains, from the server via the second communication interface, a history of a voice notification presented by voice that is presented by the presentation device which has been sent to the presentation device according to an operation state of each of one or more appliances, the operation state having been obtained from the one or more appliances by the server via the network, and
the UI includes the history of the voice notification presented by the presentation device which has been obtained and accepts turning off the voice notification included in the history of the voice notification presented by the presentation device.

12. A presentation method performed by a presentation system that includes a server, a presentation device, and an information terminal, the presentation device and the information terminal being connected to the server via a network,
the presentation method comprising:
in the server,
communicating with the presentation device via the network;
sending, to the presentation device, a voice notification presented by voice that has been associated in advance with a condition satisfied by an operation state of each of one or more appliances, the operation state being obtained from a corresponding one of the one or more appliances via the network; and
storing a history of the voice notification having been sent to the presentation device,
in the presentation device,
receiving the voice notification from the server via the network, and presenting the voice notification, and
in the information terminal,
communicating with the server via the network by a second communication interface including a wireless or a wired interface, which is included in the information terminal;
creating a user interface (UI) for accepting an operation performed by a user, and causing a display to display the UI, the display being included in the information terminal; and
obtaining the history of the voice notification presented by the presentation device from the server, wherein
the UI includes the history of the voice notification presented by the presentation device which has been obtained, and accepts turning off the voice notification included in the history of the voice notification presented by the presentation device.

* * * * *